Dec. 19, 1961   G. S. BACHMAN   3,014,085
COMPOSITE GLASS FIBER BATTERY SEPARATOR
Filed Dec. 12, 1958
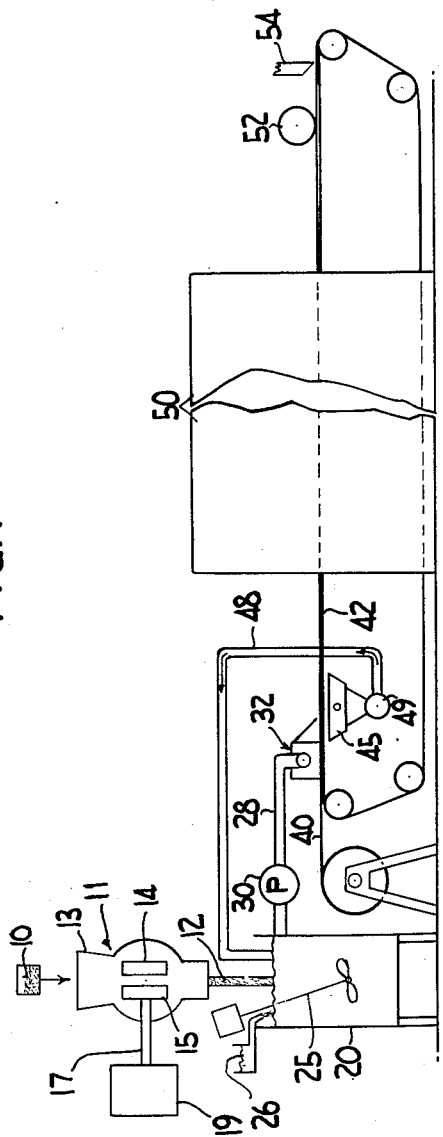
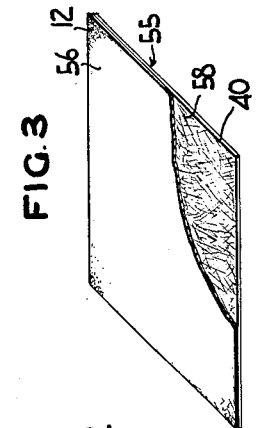
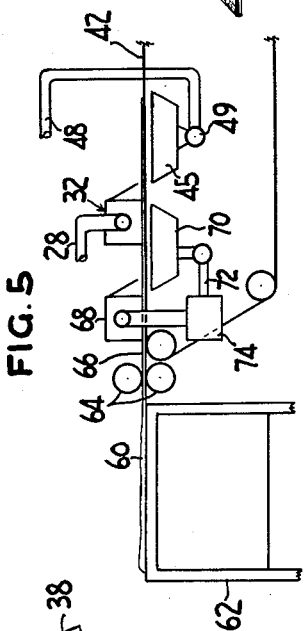
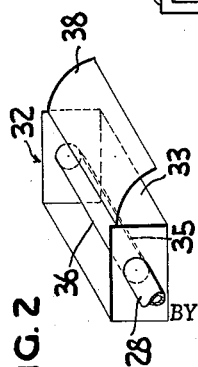
INVENTOR.
GEORGE S. BACHMAN
BY
Oscar L. Spencer
ATTORNEY

3,014,085
COMPOSITE GLASS FIBER BATTERY SEPARATOR

George S. Bachman, Metuchen, N.J., assignor to Pittsburgh Plate Glass Company, Allegheny County, Pa., a corporation
Filed Dec. 12, 1958, Ser. No. 780,093
5 Claims. (Cl. 136—145)

This invention relates to battery separators and it has particular relation to battery separators made of glass fibers.

It is known that glass wool mats can be used as retainer mats in a lead-acid storage battery. Glass wool in its commercial forms is too porous when formed in a thin mat to permit its use by itself as a battery separator. It does not prevent lead sulfate crystal growth between electrodes, which is commonly known as "treeing." The glass wool mats must be used in combination with other materials such as microporous rubber, wood or phenolic impregnated paper, which other materials act as the separator to prevent "treeing" in the battery.

It is an object of this invention to provide a glass fiber battery separator which consists essentially of glass fibers and a binder therefor in such form that the fibers form a microporous separator which permits passage of the electrolyte in the battery through it and vertical flow of gases in the battery, but does not permit "treeing." It is desired that the glass fiber battery separator have a low resistance and that it permit proper operation of the battery under all normal uses of a battery.

It is a further object of the invention that the battery separator be sturdy, yet flexible, so as to permit handling and assemblage of the separator in the battery. A glass fiber battery separator having these properties has the advantage that it is more resistant to deterioration by battery acids and solutions than cellulose-containing separators and, therefore, provides longer life for the battery, and it is less expensive than microporous rubber separators.

In accordance with the invention, a glass fiber battery separator is prepared by milling glass fibers 1 to 5 microns in diameter to reduce their length so that about 90 percent or more by weight of the fibers have an average length of 0.008 to 0.125 inch, dispersing the short fibers in an aqueous solution and depositing the aqueous dispersion of the short fibers on the surface of a porous glass fiber mat. The short, milled fibers are closely bonded to each other in felted, haphazard, overlapping relation to form a microporous layer on the surface of the porous glass fiber mat. The binding is achieved by a resinous binder which may be applied as part of the aqueous dispersion of the milled fibers or in a separate application. The binder is present in an amount which is sufficient to bond the fibers together but not form a continuous film between the fibers and thereby prevent the formation of a microporous layer. There should be sufficient binder to provide strength and flexibility to the separator for handling in the formation of the battery and during the use of the battery. The binder content in the microporous layer may range from 10 to 30 percent by weight of the glass fibers in the microporous layer. The binder content in the porous layer may range from 15 to 30 percent by weight of the fibers in the porous layer. It has been found that less binder in each layer is required as the fiber length to diameter ratio is greater.

The deposited layer of short, milled fibers forming the microporous layer on the porous glass fiber mat has a density of about 9 to 15 pounds per cubic foot as contrasted to the density of the porous glass fiber mat which is about 1 to 8 pounds per cubic foot. In a conventional separator having an overall thickness of about 0.068 to 0.086 inch or in most instances 0.07 to 0.08 inch, the thickness of the microporous layer can be approximately the same or slightly less than the thickness of the porous layer. For example, the thickness of the microporous layer of short fibers may range from 0.02 to 0.04 inch and the thickness of the porous glass fiber mat may range from 0.03 to 0.06 inch.

The glass fiber separator and its method of manufacture can be further described by reference to the drawing in which:

FIG. 1 is a diagrammatic view of an apparatus suitable for making the separator;

FIG. 2 is an isometric view of a portion of the apparatus shown in FIG. 1;

FIG. 3 is an isometric view, partially cut away, of the battery separator;

FIG. 4 is a view in section taken along lines IV—IV of FIG. 3, and

FIG. 5 is a diagrammatic view of apparatus which represents a modification of the apparatus shown in FIG. 1.

In the practice of the invention, staple glass fibers such as may be formed by the introduction of a glass rod into a high temperature, high velocity blast as described in U.S. Patent No. 2,489,243 may be used to form the short fibers of the microporous layer. These fibers may have an average diameter of 1 to 5 microns and average length of about ½ to 10 or more inches. Other types of glass fibers may be used as a starting material and may vary in composition. The composition of a typical glass fiber which is useful as a starting material is as follows:

| Ingredient: | Percent by weight |
|---|---|
| $SiO_2$ | 59.2–59.8 |
| $Na_2O$ | 14.6–14.95 |
| $Al_2O_3$ | 3.75–4.8 |
| $ZrO_2$ | 4–4.2 |
| $B_2O_3$ | 7.5–7.9 |
| $TiO_2$ | 8.25–8.9 |
| $Fe_2O_3$ | 0.04–0.14 |

The staple glass fibers 10 and water are introduced into a Bauer disc mill 11 which grinds the fibers up so that they are reduced in length so that about 90 percent or more by weight of the fibers have an average length of 0.008 to 0.125 inch. The ratio of the length of the milled fibers 12 to the diameter is such that 90 percent by weight or more of the fibers have an average length to diameter range of 100:1 to 500:1. The disc mill is composed of a housing 13 in which are mounted two alundum discs 14 and 15 which are in slightly spaced, face-to-face relation to each other. One of the discs 14 is stationary while the other disc 15 is mounted on a shaft 17 connected to a motor 19. The degree of grinding and reduction in length of the fibers is controlled by the distance between the faces of the discs, the power supplied to the rotating disc 15 and the length of time of grinding. By way of example, the discs, which may be 8 inches in diameter, may be about 0.001 inch apart and disc 15 may be rotated at about 3400 r.p.m.

The short, milled fibers 12 in an aqueous carrier are then deposited in a container 20 in which they are dispersed and maintained in this condition by means of a conventional pulping stirrer 25 such as a Waring blender. The pH of the dispersion is adjusted to about 9 to 10 by the addition of $NH_4OH$.

A binder 26 is mixed at room temperature into the dispersion of fibers in the container 20 to provide a binder-fiber mixture suspended in an aqueous medium. The pH of the binder-fiber mixture after addition of the binder is about 9.5 to 10. A typical binder-fiber mixture is as follows:

| Ingredient: | Parts by weight |
|---|---|
| Aqueous polystyrene latex containing 40% by weight of solids | 76 |
| Aqueous butadiene-styrene latex containing 48% by weight of solids with the molar ratio of the butadiene to styrene being 40 to 60% | 5.5 |
| Plasticizer (butyl benzyl phthalate) | 19.0 |
| Wetting agent—Triton X-155 (alkylaryl polyether alcohol) | 4 |
| Carbon black | 10 9/16 |
| Short, milled fibers: Average diameter—3 microns, average length—1/32 inch | 4 |
| Water | 498 |

It is preferred that the binder be in particle form such as the form of synthetic latices which are prepared by aqueous emulsion polymerization of ethylenic monomers, although other forms of synthetic resinous binders which are inert with respect to lead-$H_2SO_4$ battery reactions are suitable. Water soluble, inert, organic resins such as the water soluble phenolic resins are contemplated as well as the latices which are prepared by aqueous emulsion polymerization of ethylenic monomers such as the various acrylates which are esters of acrylic and methacrylic acid and an aliphatic alcohol having 1 to 6 carbon atoms including, for example, methyl methacrylate and methacrylate, vinyl chloride, styrene, acrylonitrile, chloro vinyl acetate, butadiene, vinylidene chloride and various co-polymers of the above monomers such as butadiene-acrylonitrile, vinyl chloride-vinyl acetate, butadiene-styrene copolymers and like materials which can be employed in latex form as glass fiber binders. The latices generally have an average particle size of 0.1 to 5 microns. A plasticizer is employed with latices which tend to deposit as brittle or discontinuous films. For example, a plasticizer is generally used with latices of polyvinyl acetate, polyvinyl chloride, a polyacrylate and polystyrene; whereas, a plasticizer is generally not used with a butadiene-styrene latex. The plasticizer may be any known plasticizer for the various resins such as dibutyl phthalate, tricresyl phosphate, dioctyl phthalate, diisooctyl phthalate and other esters which are conventionally used as plasticizers.

A combination of resins which has been found to be useful to provide the desired properties to the separator is that of polystyrene and butadiene-styrene latices. The polystyrene is the principal binder and the butadiene-styrene is present in amounts of 5 to 10 percent by weight of the polystyrene to provide added flexibility and strength to the separator.

The fibers 12 and binder 26 are stirred in the container 20 for sufficient length of time to insure uniform dispersion of the various ingredients. It has been found that the binder-fiber dispersion as set forth in the formula above should be stirred within the container for at least thirty minutes to achieve a uniform dispersion. The amount of fibers in the solution varies from 1/2 to 2 percent by weight of the solution and the amount of binder varies from 8 to 14 by weight of the solution. The viscosity of the solution should be within about 4 to 8 centipoises at 20° C. Small amounts of other short fibers such as 1 to 20 percent by weight of asbestos fibers or 1 to 5 percent by weight of cellulose fibers based upon the weight of the glass fibers may be deposited with the glass fibers and be present in the microporous layer.

The dispersed fiber-binder mixture is pumped through a cylindrical line 28 by means of a pump 30 into a coater 32. The coater 32 is in the form of a rectangular trough with one side 33 being lower than the other three sides. The binder-fiber dispersion is provided to the coater under pressure through a slit 35 in the bottom of an extension 36 of the cylindrical line 28 which projects into the coater. The binder-fiber dispersion circulates in the coater due to the force under which it issues from the slit 35. This circulation maintains the fibers and binder uniformly dispersed in the solution. The dispersion of binder and fibers flows over the top of side 33 and down an incline 38 attached to the top of side 33 and onto a porous glass fiber mat 40 carried on a foraminous conveyor 42, which is driven by suitable means not shown.

The porous mat 40 which passes under the coater and receives the dispersion is supplied from a roll mounted at one end of the conveyor 42. The porous mat may be such as that shown in U.S. Patent No. 2,578,534 and manufactured in the method described in that patent on apparatus such as shown in U.S. Patent No. 2,609,320. The porous mat is formed by first drawing a group of fibers from a molten mass of glass and winding them on a large drum in layers with the fibers in each layer being substantially parallel to each other and at a slight angle to the fibers in each adjacent layer to form what is known as a condensed mat of fibers. This condensed mat of fibers is removed from the drum by slitting the mat across the face of the drum parallel to the axis of the drum. The condensed mat of fibers is then stretched by grasping the fibers along one side of the mat and pulling them away from the mat in a direction perpendicular to the general lie of fibers in the mat. This causes the fibers to rotate and pass over each other to form a stretched, porous mat wherein the fibers are in layers with the fibers in each layer being intertwined with those in adjacent layers and being at substantially 30 to 90° angles with the fibers in the adjacent layer. The diameter of these fibers may be about 0.00075 to 0.0009 inch. The fibers may be formed of conventional lime-soda-silica compositions which are the same as those of sheet and plate glass.

The orientation of the fibers in the stretched mat provides sufficient porosity for the electrolyte to flow readily through the layer of fibers and also permits the passage of gases given off in the battery reactions. The porosity of this layer of fibers is about 60 to 92 percent. The fibers are bound in this orientation by means of a resin which is insoluble in water and which is inert and unaffected by the battery acid solution. A suitable resinous binder is polystyrene, phenol formaldehyde or one of the other resinous binders mentioned above. Other glass fiber layers which have sufficient porosity to permit the passage of the electrolyte and gases through them may be used in place of the stretched mat just described. The orientation of these fibers in general will be such that the fibers cross over each other at angles of about 30 to 90° in order to provide the desired porosity. The average length of the fibers in the porous layer is in excess of about 1 inch and is sufficient to provide the porosity and strength required in the porous mat. The fibers will for the most part extend substantially completely across the face of the mat. The porous mat of glass fibers is approximately 0.03 to 0.06 inch in thickness for the conventional battery separators which are approximately 0.07 to 0.08 inch in thickness.

A layer approximately 0.02 to 0.04 inch in thickness of the short, milled fibers is deposited on the porous mat from the binder-fiber dispersion as the porous mat 40 passes under the coater 32. Directly underneath the point of departure of the binder-fiber dispersion from the inclined surface 38 is located a suction tank 45 which acts to pull the water and some binder through the porous mat 40 and conveyor screen 42. The short fibers 10 deposit on the porous glass fiber mat 40 and build up into the felted, microporous layer. It is to be pointed out that a substantial portion of the binder which is present in the dispersion produced in container 20 passes through the porous mat 40 and conveyor screen 42 into the tank 45 so that the percent of resin remaining in the microporous, felted layer of short fibers is approximately 10 to 30 percent by weight of the fibers in the microporous layer.

The water and excess binder are returned through line 48 to the container 20 to be mixed with more milled fibers and binder. The conveyor screen 42 has a mesh of about 14. The suction which is maintained in the tank 45 is about 3 to 5 pounds per square inch on a 1/4 slit in the tank and is produced by suitable vacuum means 49 attached to the tank 45.

The conveyor 42 carries the microporous and porous fiber layers containing the binder to a suitable oven 50 to heat and cure the binder and cause the short fibers 12 in the microporous layer to be bonded to each other and to the porous glass fiber mat 40. It has been found that it is desirable to apply the heat from underneath the conveyor in the oven. This appears to give a more uniform concentration of binder in the microporous layer and insure sufficient binder in the porous layer to bond the layers together. Apparently the heat causes the binder to migrate to the side of the separator which is closest to the heat source. The glass fiber layers as thus formed are then cut into strips by a circular, rotating slitter 52 and chopped into small rectangular pieces by chopper 54.

The battery separators 55 as thus produced are shown in FIGS. 3 and 4. As shown in these figures, the short, milled fibers 12 are felted and bonded to each other in a uniform, dense layer 56 to provide micro-porosity for the separator. The long fibers 58 in the mat 40 are bonded to each other in a crossing orientation which is designed to permit porosity in the mat 40 and ready circulation of battery acids and passage of gases during the functioning of the battery.

The apparatus shown in FIG. 5 may be employed to produce the separators shown in FIGS. 3 and 4 in a slightly different manner. In this method a condensed mat 60 is placed on a table 62 and stretched by means of rolls 64 according to the conventional manner described above. The stretched mat 66 is fed to the conveyor 42 and is moved under an overflow coater 68 similar in construction to the coater 32. An aqueous dispersion of a resin such as polystyrene is applied from the coater 68 to the stretched mat. The water and excess binder are drawn through the mat by means of a vacuum tank 70 located underneath the conveyor 42 and coater 68 and returned by line 72 to a binder mixing tank 74 wherein the binder is replenished and the aqueous dispersion is sent back to the coater 68. Thereafter, the stretched mat with binder on it passes underneath the coater 32 where it receives a deposit of the short, milled fibers 12 as described above with respect to the process illustrated in FIG. 1. The remainder of the process for forming the battery separator is the same as described with respect to the apparatus of FIG. 1. The process as employed with the apparatus in FIG. 5 is found to be helpful in maintaining the orientation of the fibers in the porous, stretched mat as they pass through the process. It is more economical than the process illustrated in FIG. 1 because the binder for both the porous and microporous layers can be applied and cured or set in one operation. This embodiment of the invention is not necessary when the fibers of the porous mat are bonded together as in the porous glass fiber mat 40 prior to passing under the coater 32.

Although the present invention has been described with respect to specific details of certain embodiments thereof, it is not intended that such details be limitations upon the scope of the invention except insofar as included in the accompanying claims.

I claim:

1. A battery separator consisting of (1) a microporous layer of glass fibers, 90 percent or more by weight of which have an average length of 0.008 to 0.125 inch, bonded together in felted, haphazard, overlapping relation to each other by a resinous binder, said microporous layer having a density of about 9 to 15 pounds per cubic foot and a thickness of about 0.02 to 0.04 inch and (2) a porous layer of glass fibers having an average length of about 1 inch up to about the longest dimension of the separator arranged in crossing relation to each other and bonded to each other by a resinous binder, said porous layer having a density of about 1 to 8 pounds per cubic foot, the microporous layer and the porous layer being bonded to each other to form an integral composite separator 0.068 to 0.086 in thickness with the microporous layer forming one surface of the separator and the porous layer forming the other surface.

2. A method of making a glass fiber article suitable for use as a battery separator which comprises depositing an aqueous dispersion containing 8 to 14 percent by weight resinous binder and ½ to 2 percent by weight of short, glass fibers, 90 percent or more by weight of which have an average length of about 0.008 to 0.125 inch, on the surface of a porous glass fiber mat made up of long, crossed glass fibers, said porous mat having a density of about 1 to 8 pounds per cubic foot, passing the water and a small amount of the binder and fibers through the porous glass fiber mat while the majority of the binder and the short fibers collect in closely, felted, haphazard, overlapping relationship on the surface of the porous mat and bonding the short fibers to each other and to the porous glass fiber mat by a resinous binder.

3. A method of making a glass fiber article suitable for use as a battery separator which comprises depositing an aqueous dispersion containing 8 to 14 percent by weight of a synthetic resin binder and ½ to 2 percent by weight of short, glass fibers, 90 percent or more by weight of which have an average length of about 0.008 to 0.125 inch on the surface of a porous glass fiber mat made up of long, crossed fibers, passing the water through the porous glass fiber mat while the short fibers and a portion of the binder collect in closely felted relationship on the surface of the porous mat and bonding the short fibers to each other and to the porous glass fiber mat by the resinous binder.

4. A method of making a glass fiber mat suitable for use as a battery separator which comprises stretching a condensed mat of fibers to produce a porous mat of long, crossed glass fibers, depositing on the porous mat of glass fibers an aqueous dispersion of 8 to 14 percent by weight resinous binder and ½ to 2 percent by weight of short, glass fibers, 90 percent or more of which have an average length of about 0.008 to 0.125 inch, passing the water and a small amount of the binder and fibers from the dispersion through the porous glass fiber mat while the majority of the binder and short fibers collect in closely felted relationship on the surface of the porous mat and simultaneously bonding the long fibers in the porous mat to each other and the short fibers to each other and to the porous glass fiber mat by a resinous binder.

5. A method of making a glass fiber mat which is suitable for use as a battery separator which comprises milling glass fibers until the average length of 90 percent or more by weight of the fibers is reduced to about 0.008 to 0.125 inch, forming an aqueous, uniform dispersion of 8 to 14 percent by weight resinous binder and ½ to 2 percent by weight of the short fibers, depositing the dispersion on a porous glass fiber mat made up of long, crossed fibers, passing the water and a small amount of the binder and fibers from the dispersion through the porous glass fiber mat while the majority of the binders and the short fibers collect in closely felted relationship on the surface of the porous mat and bonding the short fibers to each other and to the porous glass fiber mat by a resinous binder.

References Cited in the file of this patent

UNITED STATES PATENTS

| | | |
|---|---|---|
| 2,454,100 | Slayter | Nov. 16, 1948 |
| 2,484,787 | Grant | Oct. 11, 1949 |
| 2,574,221 | Modigliani | Nov. 6, 1951 |
| 2,578,534 | Giles et al. | Dec. 11, 1951 |
| 2,653,985 | Philipps | Sept. 29, 1953 |